May 9, 1961 E. HAAS 2,983,359
CONVEYOR FEED FOR CLICKING DIE PRESS
Filed Sept. 6, 1957 2 Sheets-Sheet 2

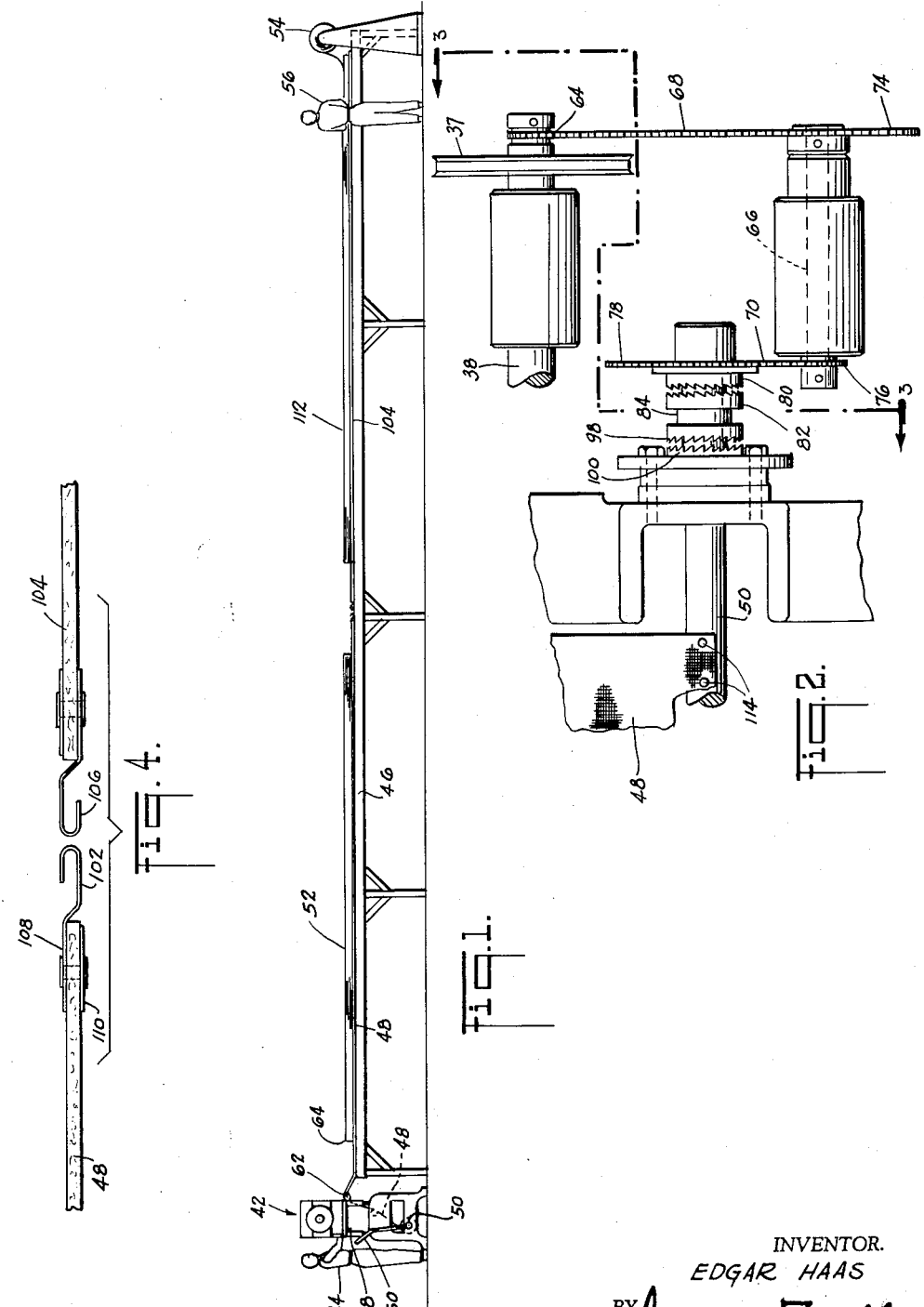

INVENTOR.
EDGAR HAAS
BY James and Franklin
ATTORNEYS

United States Patent Office 2,983,359
Patented May 9, 1961

2,983,359

CONVEYOR FEED FOR CLICKING DIE PRESS

Edgar Haas, New York, N.Y., assignor to Herman Schwabe, Inc., Brooklyn, N.Y., a corporation of New York Filed Sept. 6, 1957, Ser. No. 682,543

5 Claims. (Cl. 198—19)

This invention relates to clicking die presses, and more particularly to a conveyor feed to facilitate "layup" and feed of multiple layers of material to the press.

The primary object of the present invention is to generally improve apparatus of the clicking die type. An ordinary clicking machine is fast and desirable when working with small pieces of material, for example, genuine leather hides. However, when operating on long webs of material, for example, fabric and synthetic plastics or imitation leather materials, it is preferred to use a clicking die press, so that long lengths of the material may be fed into the press from the rear. It is customary to provide a layup table with one end adjacent the rear of the press, thus facilitating the stacking of multiple layers of material preparatory to moving the same into and through the press. In order to help handle the considerable weight of long multiple plies of material, it has been proposed to provide a layup table equipped with an endless belt, and power means to move the belt. Such arrangements are costly, and require a special layup table which forms a part of the endless conveyor system. Moreover, it is not possible to layup a new supply of material while continuing with the die cutting of previously laid up material.

One object of the present invention is to overcome the foregoing difficulties, and to provide conveyor apparatus which is simple and inexpensive, and which may be used with layup tables of the type already used in the plant. A further object is to provide a conveyor apparatus which makes it readily possible for special layup men to layup a second stack of material while a first stack is being cut in the press by the operator of the press.

To accomplish the foregoing general objects, and other more specific objects which will hereinafter appear, my invention resides in the clicking die press and conveyor elements, and their relation one to another, as are hereinafter more particularly described in the following specification. The specification is accompanied by drawings in which:

Fig. 1 is a side elevation of a press and conveyor apparatus embodying features of my invention;

Fig. 2 is a front elevation drawn to enlarged scale and explanatory of a special clutch brake forming a part of the invention;

Fig. 4 is a detail drawn to enlarged scale, and showing one way to releasably connect one feed strip to another.

Figure 5:
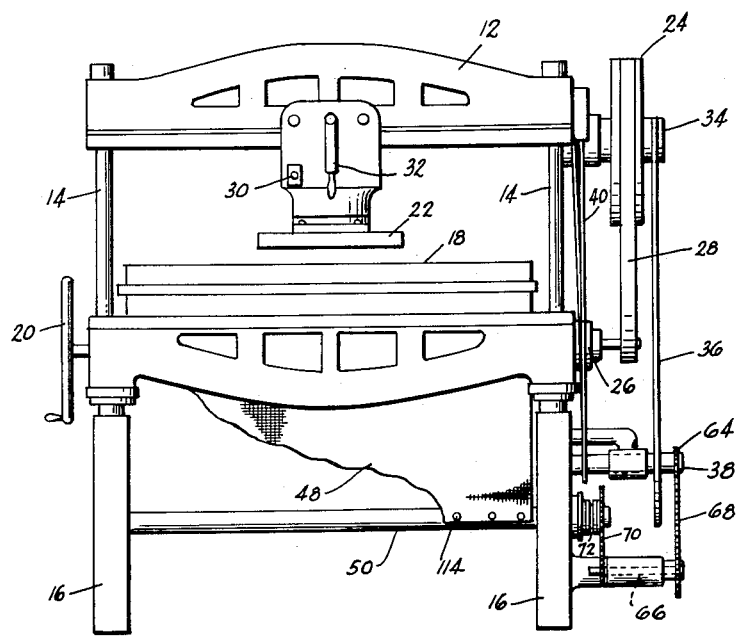
Fig. 5 is a view looking from the front of a clicking die press embodying features of my invention.

Referring to the drawing, and more particularly to Fig. 5, I there show a typical clicking die press which comprises a stationary bridge 12 carried on four columns 14 (two at each end) supported by base members 16. A large wood cutting block or cutting table 18 is also supported on the columns 14. The height of the table is minutely and accurately adjustable by means of a handwheel 20, which is geared to cause simultaneous equal rotation of four screws at the four corner columns 14.

The cutting table in the present machine is twenty-two inches by sixty inches, and will receive material up to sixty inches in width, the material being fed from the rear through the open back of the machine and over the cutting table 18. A steel rule die is laid on the material and is struck downward by a cutting head 22. This is reciprocated vertically by a suitable splined or square shaft (not shown but concealed by bridge 12) extending from one end of the machine to the other, and driven by a large wheel 24 which acts both as a flywheel and a pulley. This is driven by a motor 26 through a belt 28. In practice, a number of parallel V section belts may be used with grooved pulleys. The square shaft is turned a single revolution at a time, by means of a single revolution clutch disposed between the wheel 24 and the said shaft. An eccentric is slidable along the shaft with the head, and moves the cutting plate 22 down and back in one cycle or revolution of the shaft. The head is provided with a push button 30, and when this button is pressed, the circuitry controlled by it causes engagement of the single revolution clutch, and a consequent die cutting operation.

The entire cutting head is rapidly and readily moved to the right or left by corresponding motion of a control lever 32. The actual movement is power driven, and for this purpose a pulley 34 working through a link belt 36 drives a countershaft at 38 which in turn drives a link belt 40 leading back up to the bridge 12 of the press. The belts 36 and 40 run continuously, like the belt 28, and thus the motion of the cutting head 22 to the right or left is independent of the cutting action.

In practice, the operator moves the cutting head out of the way to the right or left; places the die in desired position; moves the cutting head back over the die; and thereupon presses the button 30 to operate the cutting head. It is thereupon immediately moved out of the way by means of lever 32; the die is shifted to a new position on the material being cut; the head is returned by means of lever 32; and button 30 is again pressed for another cutting operation.

Referring now to Fig. 1 of the drawing, the clicking die press is shown at 42, with an operator standing in front of the press at 44. A very long layup table 46 is disposed behind the press, with one end of the table adjacent the rear of the press. A long flexible feed strip 48 rests on the table 46, and has its forward end connected to a windup roll or shaft 50. The apparatus includes a drive means, to be described later, to drive the roll 50 in order to windup the feed strip 48. The material to be cut is preliminarily laid up on feed strip 48, as is indicated by the stack of material 52. This may consist of many plies of material, depending on the thickness of the individual plies. The material may be taken from a roll or bolt, shown at 54. The end of this material is drawn over the table and over the feed strip 48, preferably by a pair of workers, one on each side of the table. One such worker is indicated at 56. In many cases, a so-called "lay-up machine" may be used. A first layer is cut, and the new resulting forward edge is pulled forward to overlie the edge of the first layer of material, and so on.

The apparatus is further provided with a control means 60 which may be used to start and stop the roll 50. The feed strip 48 passes over a guide roller 62 located immediately adjacent the rear edge of the cutting table 18 of the press. The windup roll 50 is preferably a horizontal roll located beneath the cutting table, and the feed strip 48 runs around the guide roller 62 and thence down to the roll 50. Additional intermediate guide rollers may be provided, if needed.

The cutting table 18 may have a width of, say twenty-two inches in the direction of the layup table. On consideration, it will be seen that by operating the control 60, the feed strip 48 may be advanced to bring the forward edge 64 of the stack 52 over the cutting table 18 as far as the forward edge of the cutting table, whereupon it is stopped, and the operator 44 proceeds to operate the clicking die press repeatedly until he finally has consumed the entire area of the stack over the cutting table 18. He then manipulates the control 60 to advance the feed strip 48 about another twenty-two inches, thus bringing a new area of the stack over the cutting table 18, whereupon he proceeds to cut the new area by repeated positioning of the die and repeated cutting operations. This is done until the entire layup of material 52 has been used.

It will be understood that the longer the layup the less waste of material, because there is waste at the end edges, which waste is minimized by minimizing the number of end edges. Thus, in some installations, the layup 52 may be fifty feet long, and in Fig. 1, the layup is about twenty-five feet long.

If desired, a separate motor may be provided for driving the windup roll 50, but in preferred form, the roll is driven from a shaft of the press which is anyway continuously rotating.

Reverting to Fig. 5, the countershaft 38 is such a shaft, and it is here provided with a small sprocket wheel 64 which drives an added countershaft 66 through a chain 68. This in turn drives the windup roller 50 through another chain drive 70. A special form of clutch brake generally designated 72 is provided at the end of windup roller 50.

Figure 3:
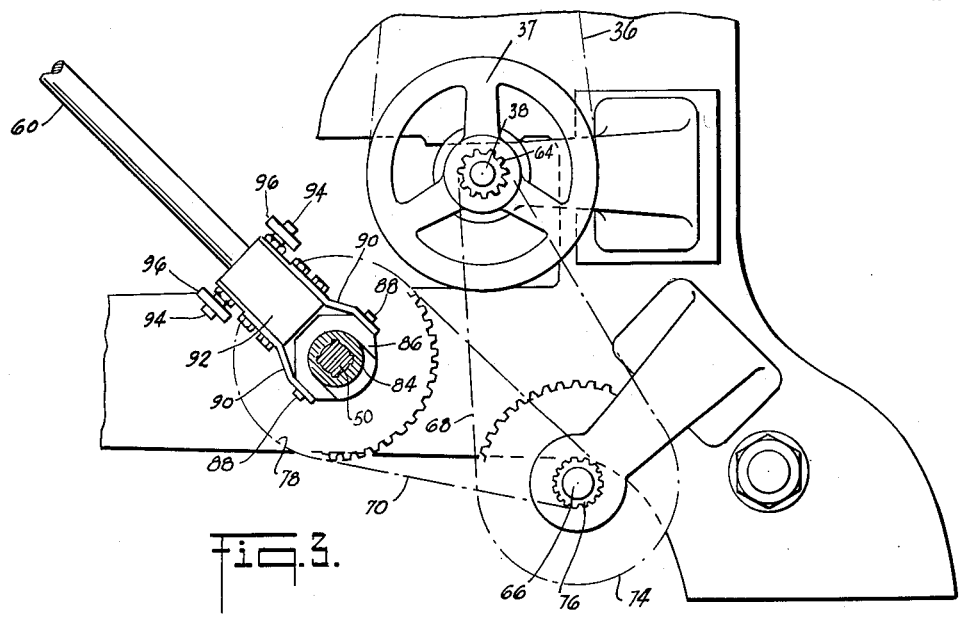
Fig. 3 is a fragmentary sectional view drawn to enlarged scale, on the line 3—3 of Fig. 2, and showing the clutch-brake and associated drive means.

Referring now to Figs. 2 and 3 of the drawing, these again show how shaft 38 is provided with sprocket pinion 64 driving countershaft 66 by means of a chain 68 which acts on a sprocket gear 74. The shaft 66 carries a sprocket pinion 76 which drives a sprocket gear 78 through a chain 70. The sprocket gear 78 is secured to the driving part 80 (Fig. 2) of a clutch (72 in Fig. 5), the driven part 82 of which is splined or otherwise slidably secured to the windup roll 50. The driven clutch member 82 has a groove 84 by means of which it may be shifted axially.

Referring now to Fig. 3, a U-shaped member or yoke 86 is received in the groove 84, and is pivoted at 88 to arms 90 secured to the lower end 92 of the control lever 60 previously referred to. The latter is pivoted at 94 in suitable stationary supports 96.

It will thus be evident that by shifting the operating lever 60 to one side or the other, the clutch may be engaged or disengaged. The stop action is accurate and instantaneous because of the great weight of the stack 52, and precisely the desired amount of material may be fed over the cutting table.

For a reason described later, I prefer to employ a specially modified kind of clutch-brake, rather than a simple clutch, and reverting to Fig. 2, it will be seen that the driven member 82 of the clutch has additional teeth 98 at its other end. These cooperate with stationary teeth 100 fixedly mounted on the frame of the machine. Thus, by pulling the control lever to one side or the other, the feed strip is moved or stopped. However, by positioning the clutch member in mid position, the windup roll is freed for return movement, and the feed strip may be pulled back over the layup table to receive a new stack of material.

As so far described, the apparatus would have only a single feed strip. However, in accordance with a further feature and object of the present invention, workmen, such as the man shown at 56, may be employed to form a new layup of material while the operator 44 is working on previously laid up material. For this purpose, the layup table 46 is made much longer than the feed strip, and a plurality of feed strips are provided. Viewed differently, there are a plurality of feed strips, each of which is only a fraction of the length of the layup table, and in the convenient and typical case here illustrated, the feed strips are about one-half the length of the layup table. In actual practice, the length of the layup table is frequently determined by the floor space available, and thus if seventy feet are available, the feed strips may be made say thirty-five feet long.

Referring now to Fig. 4 of the drawing, the rear end of the first feed strip 48 is provided with a readily releasable connection 102. The forward end 104 of the next feed strip is provided with a mating releasable connection 106. Various kinds of connection may be provided, but in the form here illustrated, a metal strip 108 is riveted to the end of the canvas feed strip 48. A thin backing strip 110 may be provided on the opposite side of the canvas to strengthen the riveted connection. The metal strip 108 has a length corresponding to the width of the feed strip 48, typically sixty inches. One edge is bent to form a flat hook, as shown at 102. The part 106 is reversed, thus forming mating hooks which are readily engaged or disengaged.

Reverting now to Fig. 1, it will be seen that the second feed strip 104 may be spread over the rear half of the layup table 46, and workmen may lay up a stack of fabric on the feed strip 104, which strip remains stationary while the operator 44 is moving the feed strip 48 up from time to time. When the last twenty-two inch section of stack 52 has been moved on to the cutting table 18, it is free of the feed strip 48, whereupon the workman 56 may manipulate the control handle 60 to put the clutch in neutral position, and the feed strip 48 may be pulled back from the windup roll 50 until its free end reaches the forward end of the stationary feed strip 104. The hooks are then engaged and the handle 68 is manipulated to wind the feed strip 48 until the leading end of the second stack 112 is moved up to the press.

In actual practice, I prefer to provide three feed strips, thus making available a third feed strip which is then spread over the rear half of the layup table, so that a third stack of fabric may be laid up on the third feed strip. When the last section or twenty-two inches of the second stack has been moved on to the cutting table 18, the layup workmen pull the second feed strip back from the roll 50, whereupon they unhook it and put it aside. The first layup strip is then pulled back from roll 50, and its free end is hooked to the leading end of the third feed strip, which is then moved up until the forward end of its stack is brought to the press. The second feed strip is then spread over the rear half of the layup table 46, preparatory to laying up a fourth stack of fabric, and so on.

It will be understood that the second and third feed strips each have releasable connection means or hooks at both ends. These connection means are preferably oppositely faced at the ends. In the particular form of the invention here shown, the first feed strip has a hook or releasable connection means at only one end, the rear or free end. The other end is permanently secured to the windup roll 50. This is indicated in Fig. 2 by the screws 114 which permanently attach the leading end of the feed strip 48 to the windup roll 50. Of course, with this arrangement, the first feed strip is preferably made longer than the second and third feed strips, in order to provide the necessary material to reach from the cutting table downward to the windup roll. Moreover, I prefer to provide extra length, so that there are a number of extra turns of the first feed strip around the windup roll when beginning the feed operation, thus minimizing the pull at the attaching screws 114, for the load of fabric is very heavy.

However, it will be understood that if desired, one may provide three identical feed strips with hooks at both ends of each feed strip, and an additional short piece of strip secured to the roll 50, and having the hook at its free end for attachment to the first feed strip. In this case the short piece of permanently secured material is designed merely to make up for the extra length needed between the end of the layup table and the windup roll.

Reverting to the first described system, except for the first layup, the men thereafter will be using the second and third feed strips. In order not to have to handle the material over the first or forward half of the table, which is far from the roll of material, the men may prefer to form even the first layup on one of the two free feeed strips, spread over the rear half of the table. In such case, the longer permanently affixed feed strip will be used merely as a pull strip, and not as a feed strip. This is mentioned because in such case the two free feed strips may be made of material, typically heavy canvas, which is intended to minimize friction and to resist wear as it is drawn with a heavy load thereon over the table, whereas the first feed strip might then be made of a somewhat different material intended primarily to resist tension, without consideration of frictional load and wear.

The height of the cutting table of the press is selected for the convenience of the press operator. The height of the layup table is selected for the convenience of the layup men. The table is usually lower than the press, the difference being anywhere from, say eight to twelve inches. In consequence, the last part of the layup strip between the table and the guide roller 62 at the press has an uphill slope. The weight of the fabric is sufficient to cause a tendency for return movement down the slope. The modified clutch brake previously referred to, and best shown in Fig. 2, is intended to prevent this return movement. The usual clutch brake, if provided with teeth, has them faced to cause quick stoppage, that is, to prevent continued forward motion as a result of inertia. On study of Fig. 2, it will be found that the teeth on the brake parts 98, 100, are faced in opposite direction, that is, they are not designed to stop forward movement, but rather to prevent return movement. As was previously mentioned, the weight of the stack of material is alone sufficient to insure stoppage immediately upon disengagement of the clutch, and the brake action is not for that purpose at all, but rather to prevent return movement.

In Fig. 2, the teeth have been shown with perpendicular faces. This is for convenience of the draftsman, but in practice, I have found that the teeth should be given some slope, say 20°, in order to facilitate disengagement. When the clutch is engaged and is moving the stack of fabric, the load is so heavy that if the perpendicular or driving faces of the teeth have no slope at all, it is difficult for the operator to disengage the clutch. Similary, if the brake teeth have no slope at all, it may be difficult for the operator to disengage the brake.

In Fig. 4 I have shown hooks for connecting the feed strips, but other means may be used, such as snap fasteners, belt hooks, and slide fasteners of the zipper type.

It is believed that the method of constructing and using my conveyor feed for a clicking die press, as well as the advantages thereof, will be apparent from the foregoing detailed description. It will also be apparent that while I have shown and described the invention in a preferred form, changes may be made in the structure shown, without departing from the scope of the invention, as sought to be defined in the following claims.

I claim:

1. A conveyor apparatus for use with a stationary die cutting press having a cutting table of convenient height for die cutting, said apparatus comprising a long layup table having one end adjacent the rear of the press, said table being lower than the cutting table of the press at a height convenient for layup, a horizontal guide roller at the rear edge of the cutting table, a horizontal windup roll extending from one end of the press to the other below the cutting table of the press, a drive train adapted to be geared to a continuously rotating shaft of the press and leading to said roll, a clutch-brake in said drive train, whereby said roll may be either driven or held at will, three relatively long flexible feed strips on which material may be laid up, each of said strips having a length about one-half the length of the layup table, a connection means at each end thereof in the form of a metal strip secured along the end and having a flat hook shape in cross section, whereby said feed strips may be detachably connected end-to-end, and means whereby any one of said feed strips may pass upwardly from the feed table to the guide roller and thence downwardly and may be detachably connected to said roll to be wound up thereby in order to feed the laid up material to the press, the arrangement being such that a feed strip at the remote end of the table may be used for layup while a feed strip carrying a previous layup is being fed toward the press, following which the remote strip may be fed toward the press and another strip placed on the remote end of the table for layup, and so on.

2. The combination with a stationary die cutting press having a cutting table of convenient height for die cutting and a long layup table having one end adjacent the rear of the cutting table of the press, of conveyor apparatus comprising a plurality of relatively long flexible feed strips, said table being lower than the cutting table of said press at a height convenient for layup, each of said strips having a length which is long enough for layup and which is only about one-half of the length of the layup table, said strips having readily releasable connection means at each end thereof, whereby said strips may be connected readily end-to-end, a horizontal guide roller at the rear edge of the cutting table, a horizontal windup roll at the press beneath the cutting table of the press, means to connect one end of a feed strip to the roll, said feed strip passsing upwardly from the layup table to the guide roller and thence downwardly between the guide roller and the rear edge of the cutting table, a drive means to drive the roll in order to wind up the feed strip and thereby feed material laid up thereon to the press, said drive means being geared to a shaft of the press which is continuously rotated, and control means to start and stop the drive means, the arrangement being such that a feed strip at the remote end of the table may be used for layup while a feed strip carrying a previous layup is being fed toward the press, following which the remote strip may be fed toward the press and another strip placed on the remote end of the table for layup, and so on.

3. The combination with a stationary die cutting press having a cutting table of convenient height for die cutting and a long layup table having one end adjacent the rear of the cutting table of the press, of conveyor apparatus comprising three relatively long flexible feed strips, said table being lower than the cutting table of said press at a height convenient for layup, each of said strips having a length which is long enough for layup and which is only about one-half the length of the layup table, said strips having elongated readily releasable connection means at each end thereof in the form of a metal strip secured along the end and having a flat hook shape in cross section, whereby said strips may be detachably connected readily end-to-end, a horizontal guide roller at the rear edge of the cutting table, a horizontal windup roll at the press beneath the cutting table of the press, means to connect one end of a feed strip to the roll, said feed strip passing upwardly from the layup table to the guide roller and thence downwardly between the guide roller and the rear edge of the cutting table, a drive means to drive the roll in order to wind up the feed strip and thereby feed material laid up thereon to the press, and control means including a clutch-brake mechanism to drive or hold the roll, the arrangement being such that a feed strip at the remote end of the table may be used for layup while a feed strip carrying a previous layup is being fed toward the press, following which the remote strip may be fed toward the press and another strip placed on the remote end of the table for layup, and so on.

4. The combination with a stationary die cutting press having a continuously rotating shaft and having a cutting table of convenient height for die cutting and a long layup table having one end adjacent the rear of the cutting table of the press, said table being lower than the cutting table of said press at a height convenient for layup, of conveyor apparatus comprising a long flexible feed strip resting on said table, a guide roller at the rear edge of the cutting table, a horizontal windup roll at the press beneath the cutting table of the press, means to connect one end of the feed strip to the roll, said feed strip passing upwardly from the layup table to the guide roller and thence downwardly between the guide roller and the rear edge of the cutting table, a drive means to drive the roll in order to wind up the feed strip and thereby feed material laid up thereon to the press, said drive means being geared to a shaft of the press which is continuously rotated, and control means including a clutch-brake mechanism to either drive or hold the roll at will.

5. A conveyor apparatus for use with a stationary die cutting press, said apparatus comprising a long layup table having about twice the desired layup length and having one end adjacent the rear of the press, a plurality of relatively long flexible feed strips, each of said strips having a length which is long enough for layup, but which is only about half of the length of the layup table, said strips each having readily releasable connection means at at least one end thereof, whereby two strips may be connected readily end-to-end, a windup roll at the press, means to connect one end of a feed strip to the roll, a drive means to drive the roll in order to wind up the feed strip to feed material to the press, and control means to start and stop the drive means, the arrangement being such that a feed strip at the remote end of the table may be used for layup while a feed strip carrying a previous layup is being fed toward the press, following which the remote strip may be fed toward the press and another strip placed on the remote end of the table for layup, and so on.

References Cited in the file of this patent
UNITED STATES PATENTS

| | | |
|---|---|---|
| 1,082,669 | Winkley | Dec. 30, 1913 |
| 1,722,106 | Mundy et al. | July 23, 1929 |
| 2,537,381 | Turner et al. | Jan. 9, 1951 |
| 2,551,368 | Flinchbaugh | May 1, 1951 |
| 2,638,982 | Winkel | May 19, 1953 |
| 2,692,020 | Oberhardt | Oct. 19, 1954 |